(12) United States Patent
Dalton

(10) Patent No.: US 9,063,939 B2
(45) Date of Patent: Jun. 23, 2015

(54) DISTRIBUTED STORAGE MEDIUM MANAGEMENT FOR HETEROGENEOUS STORAGE MEDIA IN HIGH AVAILABILITY CLUSTERS

(75) Inventor: Michael W. Dalton, San Francisco, CA (US)

(73) Assignee: ZETTASET, INC., Mountain View, CA (US)

( * ) Notice: Subject to any disclaimer, the term of this patent is extended or adjusted under 35 U.S.C. 154(b) by 44 days.

(21) Appl. No.: 13/373,142

(22) Filed: Nov. 3, 2011

(65) Prior Publication Data

US 2013/0117225 A1  May 9, 2013

(51) Int. Cl.
*G06F 15/173* (2006.01)
*G06F 17/30* (2006.01)
*G06F 9/50* (2006.01)

(52) U.S. Cl.
CPC ........ *G06F 17/30079* (2013.01); *G06F 9/5083* (2013.01)

(58) Field of Classification Search
CPC ................................................ G06F 17/30079
USPC ........................................................ 711/148
See application file for complete search history.

(56) References Cited

U.S. PATENT DOCUMENTS

| | | | | |
|---|---|---|---|---|
| 6,442,601 B1* | 8/2002 | Gampper et al. | ............. | 709/218 |
| 7,092,977 B2* | 8/2006 | Leung et al. | ............ | 1/1 |
| 7,117,246 B2* | 10/2006 | Christenson et al. | ......... | 709/206 |
| 7,165,059 B1* | 1/2007 | Shah et al. | ............. | 1/1 |
| 7,165,158 B1* | 1/2007 | Yagawa | .................... | 711/165 |
| 7,225,308 B2* | 5/2007 | Melament et al. | ............ | 711/162 |
| 7,330,908 B2* | 2/2008 | Jungck | .......................... | 709/246 |
| 7,523,139 B1* | 4/2009 | Kemkar et al. | ..................... | 1/1 |
| 7,546,334 B2* | 6/2009 | Redlich et al. | ................. | 709/201 |
| 7,546,486 B2* | 6/2009 | Slik et al. | ......................... | 714/15 |
| 7,558,859 B2* | 7/2009 | Kasiolas et al. | .............. | 709/226 |
| 7,570,663 B2* | 8/2009 | Jungck | ........................... | 370/498 |
| 7,624,142 B2* | 11/2009 | Jungck | ............................ | 709/201 |
| 7,631,214 B2* | 12/2009 | Bockhold et al. | ............ | 714/4.11 |
| 7,669,051 B2* | 2/2010 | Redlich et al. | ................. | 713/166 |
| 7,676,702 B2* | 3/2010 | Basham et al. | .............. | 714/47.1 |

(Continued)

OTHER PUBLICATIONS

Distributed Coordination with Zookeeper, Ilya Grigorik, retrieved Feb. 22, 2013 from http://www.igvita.com/2010/04/30/distributed-coordination-with-zookeeper; published Apr. 30, 2010.*

(Continued)

*Primary Examiner* — Sanjiv Shah
*Assistant Examiner* — Daniel C Chappell
(74) *Attorney, Agent, or Firm* — Marek Alboszta

(57) ABSTRACT

A high availability cluster and method of storage medium management in such high availability cluster. A number k of nodes belonging to the cluster, where k≥2 and includes a master node, are provisioned with high-access-rate and low-access-rate storage media. A file is written to the high-access-rate medium of a serving node selected from among k−1 nodes excluding the master node. The file is also written to low-access-rate medium of each of k−2 nodes excluding the master node and the serving node. A distributed storage medium management protocol supervises file migration from the low-access-rate medium of a back-up node to the high-access-rate medium of the back-up node upon disruption of file availability on the serving node. File rebalancing relies on parameters including popularity, write- and read-requests, capacity, processing load or cost.

20 Claims, 4 Drawing Sheets

(56) References Cited

U.S. PATENT DOCUMENTS

| | | | |
|---|---|---|---|
| 7,689,510 B2* | 3/2010 | Lamkin et al. | 705/51 |
| 7,805,469 B1* | 9/2010 | Nagaralu et al. | 707/822 |
| 7,822,921 B2* | 10/2010 | Taylor | 711/114 |
| 7,890,626 B1* | 2/2011 | Gadir | 709/224 |
| 7,921,424 B2* | 4/2011 | Shutt et al. | 718/105 |
| 7,996,608 B1* | 8/2011 | Chatterjee et al. | 711/114 |
| 8,006,037 B2* | 8/2011 | Kirshenbaum et al. | 711/115 |
| 8,176,563 B2* | 5/2012 | Redlich et al. | 726/27 |
| 2002/0112008 A1* | 8/2002 | Christenson et al. | 709/206 |
| 2003/0046270 A1* | 3/2003 | Leung et al. | 707/1 |
| 2005/0010695 A1* | 1/2005 | Coward et al. | 709/253 |
| 2005/0097287 A1* | 5/2005 | Melament et al. | 711/162 |
| 2005/0132070 A1* | 6/2005 | Redlich et al. | 709/228 |
| 2005/0138109 A1* | 6/2005 | Redlich et al. | 709/201 |
| 2005/0138110 A1* | 6/2005 | Redlich et al. | 709/201 |
| 2006/0020715 A1* | 1/2006 | Jungck | 709/246 |
| 2006/0029038 A1* | 2/2006 | Jungck | 370/351 |
| 2006/0029104 A1* | 2/2006 | Jungck | 370/498 |
| 2006/0161635 A1* | 7/2006 | Lamkin et al. | 709/217 |
| 2006/0248273 A1* | 11/2006 | Jernigan et al. | 711/114 |
| 2007/0011210 A1* | 1/2007 | Flamma et al. | 707/200 |
| 2007/0088703 A1* | 4/2007 | Kasiolas et al. | 707/10 |
| 2008/0065587 A1* | 3/2008 | Iwasaki et al. | 707/1 |
| 2008/0126404 A1* | 5/2008 | Slik et al. | 707/103 R |
| 2008/0126857 A1* | 5/2008 | Basham et al. | 714/25 |
| 2008/0301199 A1* | 12/2008 | Bockhold et al. | 707/202 |
| 2009/0077097 A1* | 3/2009 | Lacapra et al. | 707/10 |
| 2009/0254572 A1* | 10/2009 | Redlich et al. | 707/10 |
| 2009/0262741 A1* | 10/2009 | Jungck et al. | 370/392 |
| 2010/0017496 A1* | 1/2010 | Kimmel et al. | 709/212 |
| 2010/0241828 A1* | 9/2010 | Yu et al. | 712/30 |
| 2010/0250497 A1* | 9/2010 | Redlich et al. | 707/661 |
| 2011/0208933 A1 | 8/2011 | Selfin et al. | |
| 2011/0225229 A1* | 9/2011 | Srivastava et al. | 709/203 |
| 2011/0252192 A1 | 10/2011 | Busch et al. | |
| 2012/0017037 A1* | 1/2012 | Riddle et al. | 711/103 |
| 2012/0117229 A1* | 5/2012 | Van Biljon et al. | 709/224 |
| 2012/0259819 A1* | 10/2012 | Patwardhan et al. | 707/674 |
| 2013/0173666 A1* | 7/2013 | Qi et al. | 707/798 |
| 2013/0326260 A1* | 12/2013 | Wei et al. | 714/3 |
| 2014/0095459 A1* | 4/2014 | Eshel et al. | 707/703 |

OTHER PUBLICATIONS

Distributed Coordination with Zookeeper, Ilya Grigorik, retrieved Feb. 22, 2013 from http://www.igvita.com/2010/04/30/distributed-coordination-with-zookeeper; published Apr. 30, 2010 (5 pages).*

Performance showdown: Flash drives versus hard disk drives, Bill O'Briend, Apr. 29, 2008, retrieved from http://www.computerworld.com/article/2535539/data-center/performance-showdown--flash-drives-versus-hard-disk-drives.html on Nov. 4, 2014 (8 pages).*

Definition of client-server, Free Online Dictionary of Computing, Jan. 25, 1998, retrieved from http://foldoc.org/client-server on Dec. 23, 2014 (1 page).*

Amur et al., "Robust and flexible power-proportional storage", Proceedings of the 1st ACM symposium on Cloud computing SoCC 10, 2010, p. 217-, ACM Press.

Andersen et al., "FAWN: A Fast Array of Wimpy Nodes", 22nd ACM Symposium on Operating Systems Principles, Oct. 11-14, 2009, Big Sky, MT, USA, pp. 1-17.

Caulfield et al., "Moneta: A High-Performance Storage Array Architecture for . . . ", 2010 43rd Annual IEEE ACM International Symposium on Microarchitecture, pp. 385-395, IEEE.

Chen et al., "Hystor: Making the Best Use of Solid State Drives in High Performance Storage Systems", Systems Research, 2011, p. 22-32, ACM Press.

Graefe, Goetz, "The five-minute rule twenty years later, and how flash memory . . . ", Proc. 3rd Int'l Workshop on Data Management on New Hardware, Jun. 15, 2007, Beijing, China.

Hybrid Drive, Wikipedia, http://en.wikipedia.org/wiki/Hybrid_drive, modification of Dec. 2011, pp. 1-3.

Koltsidas et al., "Flashing up the storage layer", Proc VLDB Endow, Aug. 24-30, 2008, Auckland, New Zealand, p. 514-525, vol. 1, Issue: 1, VLDB Endowment.

Koltsidas et al., "The Case for Flash-Aware Multi-Level Caching", 2009, pp. 1-12, School of Informatics, University of Edinburgh, United Kingdom.

Lang et al., "Wimpy Node Clusters: What About Non-Wimpy Workloads?", Proc. of the 6th Int'l Workshop on Data Management on New Hardware, Jun. 7, 2010, p. 47-55, vol. 1, ACM.

Packer et al., "Oracle Database Smart Flash Cache", An Oracle White Paper, Sep. 2010, Oracle Corporation, 500 Oracle Parkway, Redwood Shores, CA 94065, USA.

Payer et al., "Combo Drive: Optimizing Cost and Performance in . . . ", 1st Workshop on Integrating Solidstate Memory into the Storage Hierarchy, 2009, pp. 1-8, vol. 1, Issue 1.

ReadyBoost, Wikipedia, http://en.wikipedia.org/wiki/ReadyBoost, modification of Feb. 2012, pp. 1-3.

Ren et al., "I-CASH: Intelligently Coupled Array of SSD and HDD", IEEE, Apr. 11, 2011, pp. 278-289, vol. 02881, (Dept. Electrical, Computer & Biomed. Eng., U of Rhode Island).

Saab, Paul, "Releasing Flashcache", Facebook, Apr. 27, 2010, from: https://www.facebook.com/note.php?note_id=388112370932, p. 1.

Soundararajan et al., "Extending SSD Lifetimes with Disk-Based Write Caches", Proc of the 8th USENIX conf. on File and storage technologies, 2010, p. 8-22, vol. 125, Issue 51.

Vasudevan et al., "Energy-efficient Cluster Computing . . . ", Proc. of the 1st Int'l Conf. on Energy Efficient Computing and Networking, 2010, p. 1-10, vol. 45, Issue 1, ACM.

Vasudevan et al., "FAWNdamentally Power-efficient Clusters", Computing, 2009, p. 1-5, vol. 54, Issue: October, ACM Press.

Vasudevan et al., "FAWNSort: Energy-efficient Sorting of 10GB", Outlook, 2010, pp. 1-4. (http://www.pdl.cmu.edu/PDL-FTP/Storage/fawn-joulesort2010.pdf).

* cited by examiner

DISTRIBUTED STORAGE MEDIUM MANAGEMENT FOR HETEROGENEOUS STORAGE MEDIA IN HIGH AVAILABILITY CLUSTERS

FIELD OF THE INVENTION

This invention relates generally to managing heterogeneous storage media, such as high-access-rate and low-access rate storage media, in a high availability cluster with the aid of a distributed storage medium management protocol to ensure high availability of popular files to network clients.

BACKGROUND ART

Present day computer clusters are typically geographically collocated. Such clusters are constituted by a large number of nodes that are operated in a way to render the cluster highly available. In particular, it is important that certain files served by nodes of the cluster remain highly available.

The high level of their availability should be maintained even in the case of node failures and other adverse conditions.

In a typical high availability cluster, each one of the nodes has associated resources. These resources commonly include storage media on which files are stored. The media may be different, in other words, the media may be heterogeneous. The files residing on these diverse storage media are served to network clients under the direction of a master node. The service usually involves various types of requests, including typical read/write requests to those files.

The prior art has addressed the challenge of keeping certain files highly available by corresponding caching methods. For example, U.S. Pat. No. 6,442,601 to Gampper et al. describes a caching system and method for migrating files retrieved over a network from a server to a secondary storage. Gampper's system and method optimize migration of files from the primary storage to the secondary storage. They also provide a cache to store files retrieved from the server based on a distribution of file requests per unit of time and according to file size for files maintained in the primary storage and the secondary storage. Although this approach is helpful on the client side, it does not address the issues of suitable storage management on the side of a modern highly available cluster with heterogeneous storage media designed to maintain certain files highly available.

U.S. Pat. No. 7,558,859 to Kasiolas et al. describes a peer-to-peer auction strategy for load balancing across the data storage nodes with the aid of a cluster manager for each cluster of a data center. Although this teaching does address in general the automatic re-balancing of data in clusters, it does not address appropriate load balancing when the data storage nodes have available to them heterogeneous storage media. In particular, the teaching does not address situations in which the different types of storage media differ drastically in cost and performance, such as access-rate performance.

In another approach taught by Chatterjee et al. in U.S. Pat. No. 7,996,608 a RAID-style system is taught for providing redundancy in a storage system. This approach is applicable to a storage cluster that stores data on storage nodes. The cluster manages storage between these storage nodes by defining zones and mirroring each storage node to another storage node for failure resistance. Maps are used to determine which blocks of a file are allocated to which zones, and blocks may be migrated between zones during remapping. This system ensures that minimum replication levels are maintained and that load balancing occurs periodically during remapping. Still, this teaching also does not address situations in which heterogeneous storage media that differ drastically in cost and performance are deployed in the storage nodes of the cluster.

The prior art also contains still other references of interest. For example, U.S. Pat. No. 8,006,037 to Kirshenbaum et al. addresses caching issues and data migration issues in clusters. U.S. Pat. Application 2011/0208933 addresses a storage system composed of volatile storage (DRAM) and non-volatile (disk) storage. U.S. Pat. Application 2011/0252192 addresses storing objects onto flash devices or hard drives backed with non-volatile RAM (NVRAM). In the latter system, sequential Input/Output (I/O) such as a transaction log is moved to the hard drives with NVRAM to increase the lifetime of flash devices. Flash devices are used for essentially random I/O. It should be noted that the most recent generation of flash devices has vastly increased lifetime even when handling a large amount of I/O throughput.

What is important herein, is not implementing an efficient object store, but rather handling bulk data files effectively in clusters with heterogeneous storage media that may include flash devices and hard disk drives.

Melamant et al. is another work that describes two-tier storage hierarchies, supporting a system with a high-reliability/high-performance tier and a high-reliability/low-performance tier that is substantially cheaper and offline. In a distributed systems approach, however, one must address issues of disk, device, and machine failure, including implications for re-replication and load balancing. In addition, Melamant does not address load balancing and migration between storage tiers on a whole-cluster, rather than whole-machine basis, as well as dealing with storage that is supposed to stay online and available.

In fact, despite the many useful methods and protocols that have been made available, the prior art is still lacking. Specifically, it does not provide an effective method for optimally deploying heterogeneous storage media associated with nodes of a high availability cluster to maintain a high availability of certain files that are very popular.

OBJECTS AND ADVANTAGES OF THE INVENTION

In view of the shortcomings of the prior art, it is an object of the invention to provide a method and a cluster that manages heterogeneous storage media in a way that ensures high availability of popular files. More specifically, the method and the cluster are to deploy high-access-rate and low-access-rate storage media in certain nodes in such a manner, that a highly available file remains highly available despite various failures.

It is another object of the invention to provide a re-balancing method and a correspondingly provisioned cluster, in order to provide for efficient migration of popular files in a high availability cluster.

These and many other objects and advantages of the invention will become apparent from the ensuing description.

SUMMARY OF THE INVENTION

The objects and advantages of the invention are secured by a method of storage medium management in nodes of a high availability cluster that serves one or more network clients. The method calls for providing a number k of the nodes belonging to the cluster, where k≥2 and includes a master node, with a high-access-rate storage medium and a low-access-rate storage medium. A file, which is to be served to the one or more clients, is written to the high-access-rate storage medium of a serving node that is selected from among k−1 nodes excluding the master node. The file is also written to low-access-rate storage medium of each of k−2 nodes excluding the master node and the serving node. The method further calls for monitoring an availability of the file on the high-access-rate storage medium of the serving node to the one or more network clients. This step is performed by a storage medium management protocol that is distributed among the k nodes.

In accordance with the method of invention, the file is migrated from the low-access-rate storage medium of a back-up node, which is also selected from among the k−1 nodes, to the high-access-rate storage medium of the back-up node upon disruption of the availability of the file on the serving node. The disruption could be due to failure of the serving node, its loss of connection or some other event that renders it useless or unreliable. As a result, the high availability of the file to the one or more network clients is provided for even in the event of failure of the serving node.

The method extends to monitoring a popularity of the file on the high-access-rate storage medium on the serving node. When the popularity of the file drops below a certain set threshold, the file is removed from the high-access-rate storage medium. The removal of a file that is no longer popular frees up storage space on the high-access-rate storage medium. Thus, a second file from the low-access-rate storage medium can be migrated to the freed-up high-access-rate storage medium. Preferably, the popularity of the second file exceeds the set threshold in order to qualify it for migration to the high-access-rate storage medium.

During regular cluster operation, the distribution of files served to the one or more clients changes as a result of client activities such as writes to the files. This also affects the file that is being served from the high-access-rate storage medium of the serving node. Hence, the method provides for re-balancing the distribution of files between the high-access-rate storage medium and the low-access-rate storage medium of at least one of the k nodes, and normally among all the k−1 nodes. Preferably, the re-balancing is based on a parameter such as a number of write-requests, a number of read-requests, a capacity of the high-access-rate storage medium, a processing load, a processing cost or some other useful parameter. In particular, when the capacity of the high-access-rate storage medium is exceeded (overflow), and yet the file in question remains very popular, a supplementary serving node can be selected from among the k−1 nodes to help. In this case, the file can be re-distributed, e.g., by breaking it up into segments, to the supplementary serving node. This may be done with several additional nodes. For this reason, as well as other considerations, it is advantageous that the parameter on which re-balancing is based be a cluster-wide parameter. Such parameter can be computed jointly for all or a subset of the k−1 nodes.

Furthermore, it is advantageous that the file of interest be a typical data file, rather than a log file. Such file can be segmented in storage blocks that are relatively large, i.e., storage blocks that exceed a certain block size.

Depending on the cluster management protocols and provisioning for failover situations, the low-access-rate storage medium of the serving node should be mirrored. Note than mirroring the file on the high-access-rate storage medium is not desirable. Only the file as it exists on the low-access-rate storage medium should be imaged to the low-access-rate storage medium of an imaging node of the cluster. In most cases, the imaging node is the back-up node. Failover, in case of serving node failure, will typically proceed to this back-up node in accordance with most cluster management protocols.

In fact, the distributed storage medium management protocol of the invention can be easily integrated or incorporated in standard cluster management protocols, such as ZooKeeper.

The management of the heterogeneous storage media does not presume the actual identity of such media. However, in most cases the high-access-rate storage medium is a flash storage drive. Meanwhile, the low-access-storage medium will most often be a hard disk drive (e.g., SATA).

The invention also covers a high availability cluster of nodes that employ heterogeneous storage media in serving a file or files to one or more network clients. The cluster has k nodes, where k≥2 and includes a master node. One of k−1 nodes, which excludes the master node, is chosen as a serving node for serving the file or files to the network client(s). Of course, the cluster will typically have more than just the k nodes provisioned with heterogeneous storage media.

A high-access-rate storage medium is typically associated with each of the k nodes. The file is initially written only to the high-access-rate storage medium of the serving node. A low-access-rate storage medium is also associated with each of the k nodes. The file is written to the low-access-rate storage medium of k−2 nodes excluding the master node and the serving node.

The cluster of invention has a distributed storage medium management protocol residing on the k nodes. This protocol monitors availability of the file on the high-access-rate storage medium of the serving node, which is serving the file to the client. The protocol migrates the file from the low-access-rate storage medium of a back-up node, usually selected in advance from among the k−1 nodes, to the high-access-rate storage medium of the back-up node upon disruption in availability of the file on the serving node. Thus, the cluster provides for high availability of the file to the network client, even in the case of failure of the serving node.

The high-access-rate storage medium is usually a flash storage drive, while the low-access-rate storage medium is typically a hard disk drive.

The cluster also has a re-balancing module associated with each of the k nodes. The re-balancing module is configured to monitor the availability of the file and also the popularity of the file. Actions to re-balance the cluster can be undertaken based on the results of monitoring the availability and popularity of the file or files.

The invention, including the preferred embodiment, will now be described in detail in the below detailed description with reference to the attached drawing figures.

BRIEF DESCRIPTION OF THE DRAWING FIGURES

DETAILED DESCRIPTION

Figure 1:
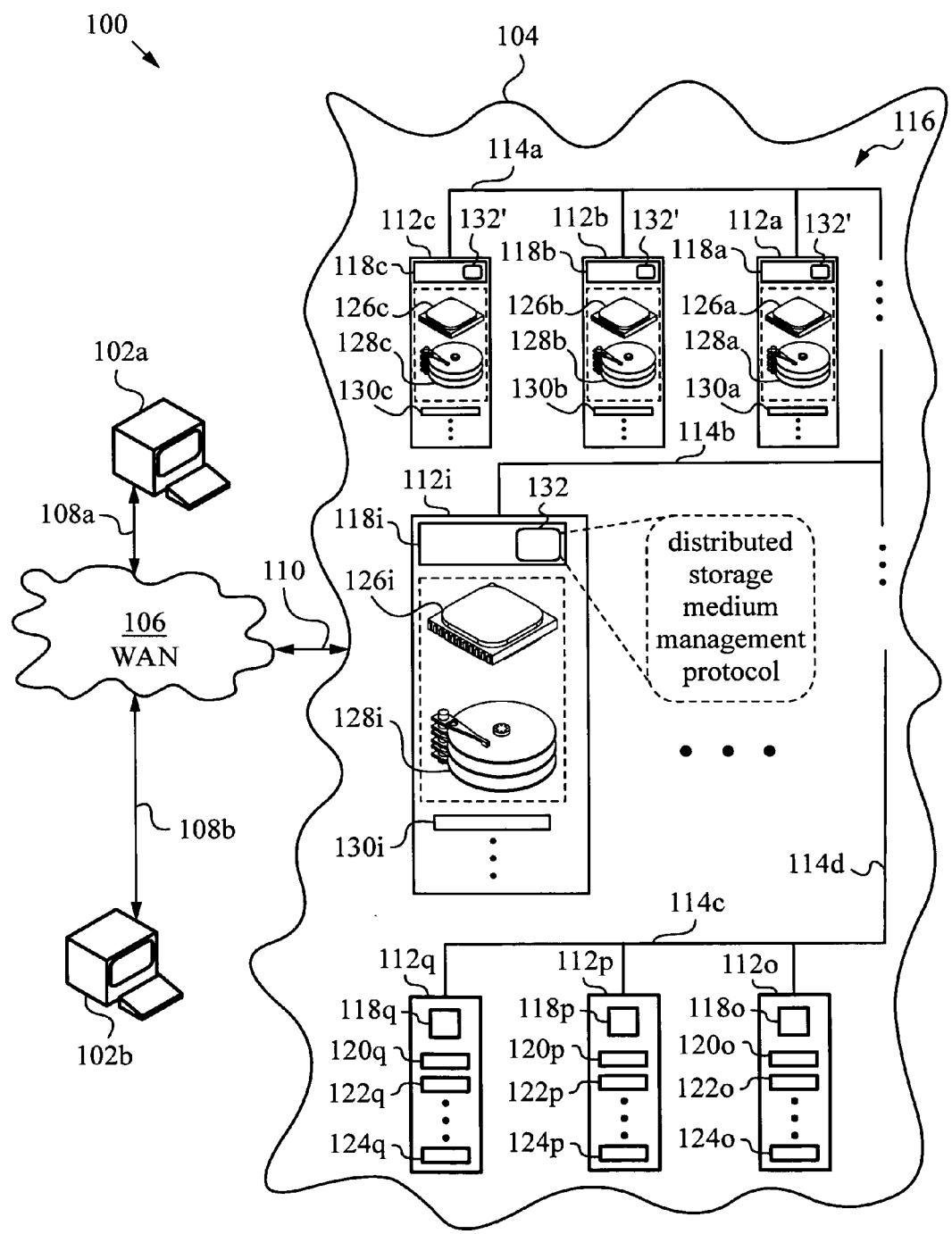
FIG. 1 is a diagram of a networking system with a high availability cluster showing the general aspect of the invention.

The present invention will be best understood by initially referring to the high-level diagram of FIG. 1. This diagram shows a networking system 100 in which network clients 102a, 102b are connected to a high availability cluster 104. Only two clients 102a, 102b are shown in FIG. 1 for reasons of clarity. It will be appreciated, however, that cluster 104 typically supports a large number of clients, e.g., on the order of thousands, tens of thousands or even larger.

Networking system 100 includes a wide area network 106, or WAN, such as the Internet and/or still other single or multiple wide area networks. It is important that WAN 106 be accessible to clients 102a, 102b at locations where services deployed on high availability cluster 104 are provided. Physical connections 108a, 108b between clients 102a, 102b and WAN 106 can be accomplished by any suitable technology including wired, wireless, optical waveguides and the like. WAN 106 is connected to cluster 104 via a network-to-network interface 110, which is preferably a very high-throughput pipe.

Cluster 104 has a number of nodes 112a, 112b, ... 112q, of which only some are explicitly shown in FIG. 1 for reasons of clarity. Typically, nodes 112a through 112q of cluster 104 are geographically collocated, and may even be housed in the same building. Further, nodes 112a through 112q are interconnected by lines 114a-d of a local area network 116, or LAN. Thus, nodes 112a through 112q can communicate among each other "privately" via LAN 116, rather than via WAN 106.

Each node 112a through 112q has a corresponding processor, server, computer or other device with processing capabilities generally referred to herein as machine 118a through 118q. Each node 112a-q also has associated with it a set of resources. The resource allocation differs in cluster 104.

Specifically, a number of nodes 112o-q have resources 120o-q, 122o-q and 124o-q. Additional resources beyond those expressly called out can be present at these nodes, as indicated by the ellipsis. Exemplary resources 120o-q, 122o-q, 124o-q include printers, monitors, application-specific processors, block storage devices including hard drive devices (e.g., parallel or serial, such as SATA), flash drives and any other cluster resources. In fact, any physical or logical component that can be brought on-line and off-line, managed in cluster 104 and hosted by just one of nodes 112o-q at a time can be represented among the set of resources 120o-q, 122o-q and 124o-q. It should be also noted that nodes 112o-q can each be provisioned with the same or different resources. A person skilled in the art will recognize that any allocation of resources and node topology is permissible.

In contrast, nodes 112a-c and 112i are selected from among nodes 112a-q of cluster 104 in accordance with the invention. Nodes 112a-c, 112i are members of a set of a number k of nodes chosen from among all nodes 112a-q of cluster 104 and provisioned in a particular way. The number k has to be at least two, i.e., k≥2, although it should typically be much larger, and it has no upper bound. Note that many additional nodes between node 112c and node 112i (e.g., node 112g) may be selected to belong to the set of k nodes. For clarity of explanation and visualization these nodes are not explicitly called out in the present figure and are instead indicated by the ellipsis.

In some embodiments all nodes 112a-q of cluster 104 belong to the set of k nodes and are specially provisioned. In other words, the number k is not restricted and can be on the order of 100s in large clusters or even on the order of 1,000s.

One of k nodes 112a-c, 112i is the master of cluster 104. In the present embodiment, node 112i is the master or leader of cluster 104. The other k−1 nodes 112a-c, preferably include a back-up master and regular nodes that are not master candidates. As a rule, the number k should preferably be much larger than the set of all master candidates (including the present master).

The special provisioning of k nodes 112a-c, 112i involves their storage resources or storage media. Specifically, each of them has storage resources 126a-c, 126i and storage resources 128a-c, 128i that differ fundamentally in access-time performance. In other words, storage resources 126a-c, 126i and storage resources 128a-c, 128i are heterogeneous. They are both shown within dashed boxes in FIG. 1 for clarity. Meanwhile, their remaining resources generally indicated by 130a-c, 130i and the ellipsis may be the same as those found at nodes 112o-q.

Storage resources 126a-c, 126i are high-access-rate storage media, such as flash storage drives. Meanwhile, storage resources 128a-c, 128i are low-access-rate storage media, such as hard disk drives (e.g., SATA) or any other storage medium that can be maintained on-line in cluster 104. In general, due to differences in performance, the cost of high-access-rate storage media 126a-c, 126i is much greater than that of low-access-rate storage media 128a-c, 128i.

It is understood that actual access-rates for any particular storage medium is more fully categorized by metrics such as read-time, write-time, Input/Output (I/O) throughput, random seek time and the like. The actual values of these metrics are not limited numerically. Rather, it is the relative difference between these two types of storage media that is important in the present invention.

Thus, in a preferred embodiment of the invention the relative difference in access-rate between high-access-rate storage media 126a-c, 126i and low-access-rate storage media 128a-c, 128i should be at least a factor of 3 and more preferably a factor of 10 or higher. This access-rate performance gap can be measured in terms of a collection of the metrics mentioned above, e.g., a simple or weighted average, or based on an average worst case scenario. Alternatively, just one of the metrics can be chosen to quantify the access-rate performance gap, such as the I/O throughput. It is important to note, however, that without a factor of at least 3 in the access-rate performance gap the advantages of the present invention will be very difficult to realize.

In accordance with the invention, cluster 104 has a distributed storage medium management protocol 132 for directing the operations of high-access-rate storage media 126a-c, 126i and low-access-rate storage media 128a-c, 128i. The overall management portion of protocol 132 is running on machine 118i of master 112i. The subordinate portions of protocol 132 are designated by reference 132' and are running on machines 118a-c of nodes 112a-c.

Master 112i does not actually store and serve any highly available files requested by clients 102a, 102b. Instead, master 112i stores metadata, including directories, names and paths. Meanwhile, the highly available files requested by clients 102a, 102b reside on nodes 112a-c. Master 112i assigns which of nodes 112a-c will serve any particular highly available file. A person skilled in the art will recognize that this convention is common and well known in the management of high availability clusters. The difference is in the manner in which master 112i and nodes 112a-c deploy distributed storage medium management protocol 132, 132' in determining from which storage medium nodes 112a-c are serving the highly available files.

Figure 2:
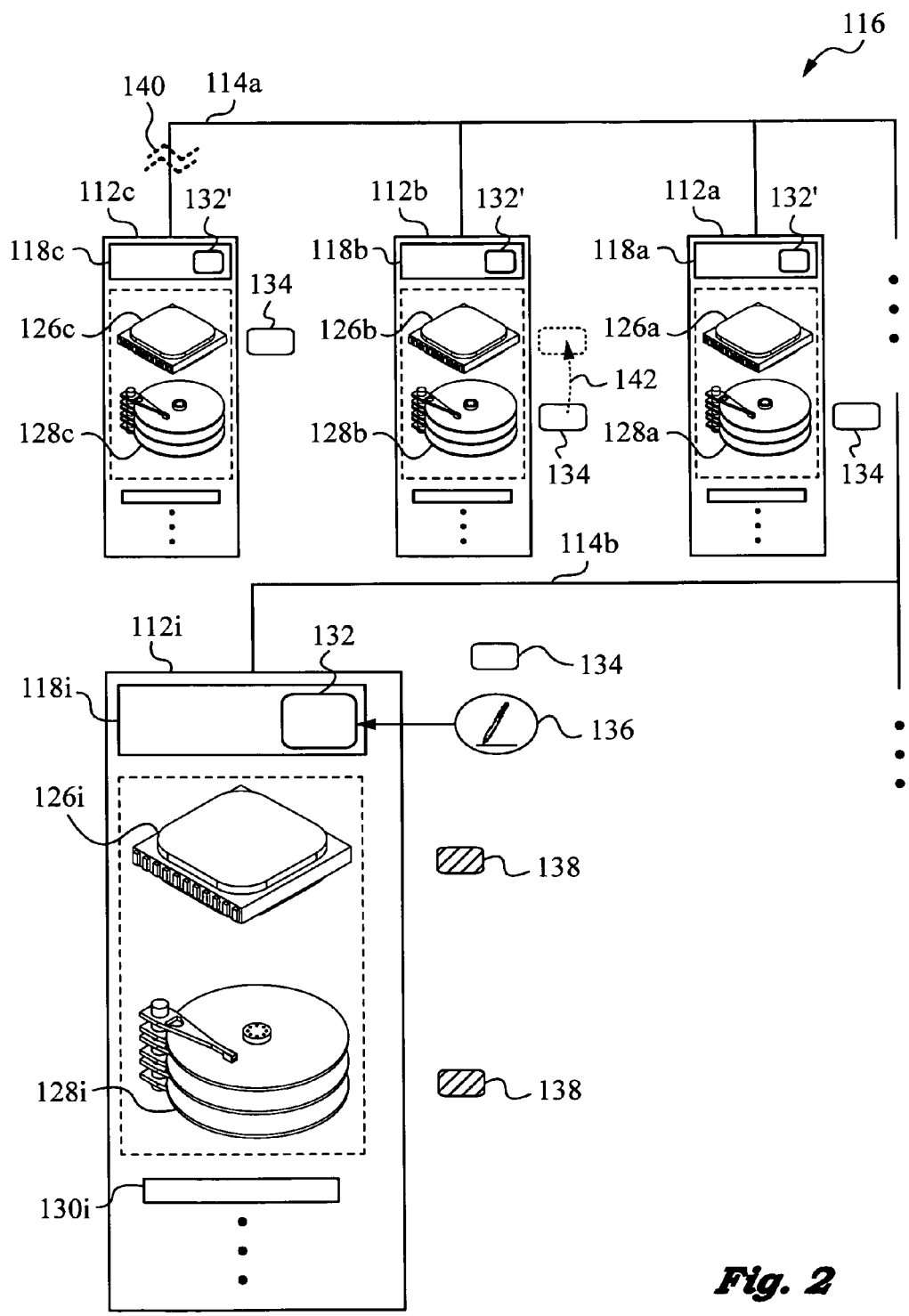
FIG. 2 is a diagram illustrating the basic operation of the distributed storage medium management protocol of the invention on a portion of the cluster of FIG. 1 shown in more detail.

To appreciate how distributed protocol 132, 132' is employed, we refer now to FIG. 2. This figure is a diagram illustrating the basic operation of the distributed storage medium management protocol 132, 132' on a portion of cluster 104. Only nodes 112a-c, 112i belonging to the set of k selected nodes are shown here.

First, a new high availability file 134 with a corresponding write-request 136 arrives in cluster 104. Master 112i employs protocol 132 running on its machine 118i to determine which one among nodes 112a-c will act as the serving node of file 134. In the present case, protocol 132 assigns node 112c to be the serving node of file 134. In addition, master 112i writes metadata 138 related to file 134 to its high-access-rate storage medium 126i and to its low-access-rate storage medium 128i. Metadata 138 includes typical information about file 134 and the chosen serving node 112c.

Next, file 134 is written to low-access-rate storage media 128b-c of nodes 112b-c, but not to master node 112i or serving node 112a. In other words, file 134 is written to each low-access-rate storage medium 128a-c of each of the k−2 nodes, excluding master node 112i and serving node 112a.

File 134 is also written to high-access-rate storage medium 126c of serving node 112c that was selected by master 112i to serve file 134. Furthermore, during normal requests for access to file 134 by clients 102a, 102b, master 112i automatically routes the requests to file 134 stored in high-access-rate storage medium 126c of serving node 112c. In particular, the routing is indicated by protocol 132. Correspondingly, metadata 138 kept by master 112i indicates the path to file 134 stored in high-access-rate storage medium 126c of node 112c. Because of the performance gap, this routing ensures that file 134 is highly available to clients 102a, 102b during normal operation.

While cluster 104 is in operation, master 112i receives the typical status information and updates from all nodes 112a-q of cluster 104 via LAN 116. A "heartbeat" as well as other signaling conventions and cluster management protocols are deployed for this purpose. These mechanisms are well known in the art of operating computer clusters.

With the aid of the above-mentioned mechanisms, master 112i is able to provide input to management portion of protocol 132 from subordinate portions of protocol 132' running on the k−1 nodes 112a-c. Thus, management portion of protocol 132 is able to monitor the availability of file 134 on high-access-rate storage medium 126c of serving node 112c.

In a preferred embodiment of the invention, management portion of protocol 132 elects a back-up node in advance of any disruption in availability of file 134 from high-access-rate storage medium 126c of serving node 112c. Alternatively, back-up node may be chosen when required based on one or more parameters such as storage capacity, processing load or still other parameters as discussed below. In the present case, node 112b is chosen as the back-up node in advance.

Upon disruption in availability of file 134 on serving node 112c, protocol 132, and more specifically management portion of protocol 132 is alerted. The disruption may be due to any typical cause, such as loss of connection, instability, failure of machine 118c, or other event that renders it useless or unreliable. In the situation illustrated in FIG. 2, the failure is due to lost connection with line 114a of LAN 116, as indicated by break 140.

Protocol 132, upon disruption of availability, issues an order directed at back-up node 112b to migrate file 134 from its low-access-rate storage medium 128b to its high-access-rate storage medium 126b. The execution of this order is indicated by dashed arrow 142. Thus, protocol 132 migrates file 134 when serving node 112c fails in order to ensure that file 134 remains highly available to clients 102a, 102b.

In addition to the above functionality that ensures continuous high availability of file 134 despite failure of serving node 112c, protocol 132 has additional advantageous features. Notably, protocol 132 provides cluster 104 with re-balancing capabilities.

Figure 3:
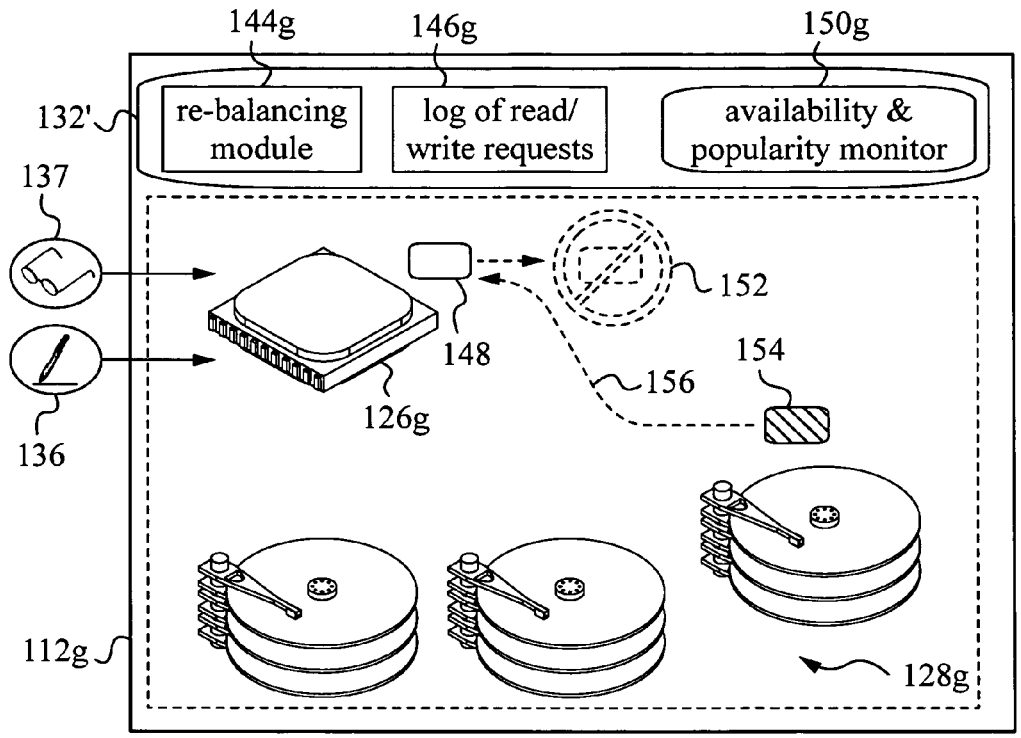
FIG. 3 is a diagram illustrating a re-balancing of high availability files in a node based on popularity in accordance with the invention.

A first example of re-balancing is illustrated with the diagram in FIG. 3. This drawing depicts a node 112g belonging to the k−1 nodes chosen in cluster 104, but not explicitly shown in the prior drawings. Node 112g runs subordinate portion of protocol 132', which includes a re-balancing module 144g. Subordinate portion of protocol 132' also has a log module 146g that tracks the number of write requests 136 and read requests 137 to a high availability file 148 that it is serving from its high-access-rate storage medium 126g. An availability and popularity monitor 150g is also included in subordinate protocol 132'. It should also be noted that low-access-rate storage medium 128g of node 112g includes three separate hard drives rather than just one. In fact, a person skilled in the art will recognize that many nodes 112 of cluster 104 may be provisioned with multiple drives or drive arrays.

Re-balancing module 144g monitors either directly based on the number of client read/write requests 136, 137 recorded by log 146g, or based on other popularity metrics gathered by monitor 150g, how popular file 148 is among clients 102a, 102b. Suitable popularity metrics can be based on not just on the number of client requests, but the processing load or I/O throughput associated with individual client request for file 148. For example, a single client 102a could be using file 148 extensively enough to keep its popularity metric high, or a number of clients 102 could be requesting file 148 often enough to keep its popularity metric high.

It is important to set a certain threshold, defined in terms of the metric used, to ensure that high-access-rate storage medium 126g is being utilized to serve only popular or preferably just the most popular file 148. That is because storage space of high-access-rate storage medium 126g is generally expensive (see above) and its capacity limited. Thus, when defined in terms of read/write requests, policies such as least-recently used (LRU) file blocks, or approximated least recently used can be employed to sort accessed data (approximately or completely) by last time accessed, and the last recently accessed information can be evicted to low-access-rate storage medium 128g when high-access-rate storage medium 126g becomes full. Alternatively, policies may also consider other characteristics beyond last access time, such as frequency of access in conjunction with last access time, such as the Adaptive Replacement Cache (ARC) cache policy.

When the popularity of file 148 drops below the set threshold, subordinate portion of protocol 132' reports that fact to managing portion of protocol 132 residing on master 112i. Furthermore, protocol 132' removes file 148 from its high-access-rate storage medium 126g to free up storage space. The removal is indicated by icon 152. Of course, file 148 will typically remain stored in low-access-rate storage medium 128g and still be served to clients 102a, 102b on request. Also, master 112i informed of the demotion of file 148 will correspondingly update its metadata about file 148. In particular, the path will be updated such that future read/write requests are directed to file 148 on low-access-rate storage medium 128g (or low-access-rate storage medium on another one of the k−1 nodes where file 148 is also present).

Now, master 112i is fully cognizant of the fact that valuable storage space on high-access-rate storage medium 126g is freed-up. It can now act in one of two ways. In a first case, master 112i devolves the responsibility back to subordinate portion of protocol 132' on re-balancing module 144g. Machine 112g is thus left to determine locally which, if any, of the files that presently reside on its low-access-rate storage medium 128g has exceeded the set popularity threshold.

In the present case file 154 qualifies under this criterion. Thus, re-balancing module 144g of protocol 132' issues the order that file 154 be migrated to high-access-rate storage medium 126g as indicated by dashed arrow 156 to take advantage of the freed-up space and ensure high availability of file 154. Protocol 132' informs protocol 132 of master 112i of re-balancing module's 144g choice of file 154. Thus alerted, master 112i can correspondingly update any metadata, including the new path to file 154 for future in-coming read/write requests from clients 102a, 102b.

In the preferred embodiment, however, master 112i itself controls the re-balancing operation in a cluster-wide manner with its own re-balancing module (not shown) included in protocol 132'. Of course, re-balancing modules 144a-c (not explicitly shown) are also associated with each of the k−1 nodes in the preferred embodiment. In other words, subordinate portions of protocol 132' all run modules 144a-c.

Armed with these provisions, actions to re-balance cluster 104 can be undertaken based on the results of monitoring the availability and popularity of many files on all k−1 nodes. The outcome may be the same, with file 154 being promoted to high-access-rate storage medium 126g. Alternatively, a file from another node 112a-c belonging to the k−1 nodes can be instructed to migrate its file to high-access-rate storage medium 126g of node 112g. In this case, the parameter being used should be a cluster-wide parameter, i.e., a cluster-wide popularity threshold established by master 112i.

The policy should ensure that minimum replication thresholds are met (i.e., that sufficient low-access-rate storage medium copies exist to ensure durability even if one or more replicas fail concurrently). The policy may also ensure adequate cluster-wide load balancing by splitting or migrating frequently accessed regions. This can be accomplished by comparing the relative read/write access ratios of the k−1 cluster machines. If one machine is serving significantly more data than the average, it may be a candidate for hot data migration. If per-machine least frequently used (LFU) or ARC policies are used, approximate or precise frequency information can be used to select individual blocks as migration candidates.

Another aspect of the invention has to do with re-balancing based on storage capacity of high-access-rate storage medium 126. Clearly, due to cost, the capacity of high-access-rate storage medium 126 cannot be very large in order to contain the cost of provisioning cluster 104. Thus, it is not just the popularity of a given file that needs to be accounted for in re-balancing, but also just the capacity of high-access-rate storage medium 126.

Figure 4:
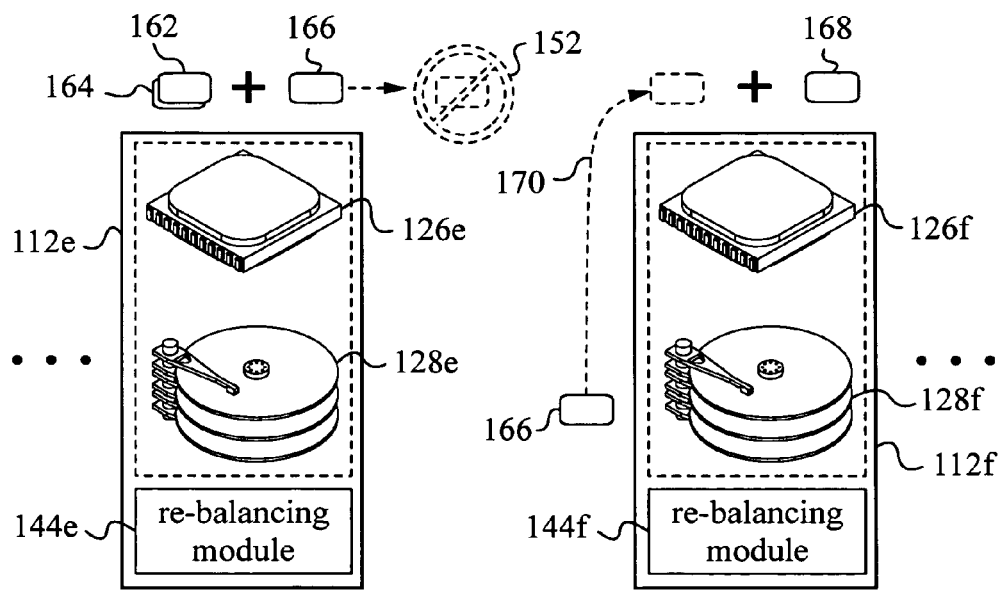
FIG. 4 is a diagram illustrating a re-balancing of high availability files based on a capacity of high-access-rate storage medium at nodes in accordance with the invention.

To better understand this, we now turn to the diagram of FIG. 4. This figure shows how to apply re-balancing of high availability files 162, 164 and 166 based on storage capacity. Files 162, 164 and 166 are served from high-access-rate storage medium 126e of a serving node 112e belonging to the k−1 nodes of cluster 104. The selection of node 112e as serving node for files 162, 164 and 166 was made by master 112i in the course of running management portion of protocol 132 in the manner as explained above, for example due to file or block falling below the minimum number of replicas, or migrating due to cluster-wide load balancing.

FIG. 4 shows re-balancing module 144e running as part of subordinate portion of protocol 132' on the machine of serving node 112e. Re-balancing module 144e monitors the size of all files 162, 164 and 166 that are being served because of their high popularity. The actual methods for monitoring the available memory in medium 126e such as a flash drive is a well known and will not be discussed herein.

As a result of read/write operations, files 162, 164, 166 end up taking more storage space, threatening to breach the capacity of high-access-rate storage medium 126e. Such situations can lead to overflow and data loss. Hence, protocol 132' lets re-balancing module 144e report to protocol 132 on master 112i that medium 126e is in danger of overflowing.

Protocol 132 locates another one of the k−1 nodes, in this case node 112f, whose high-access-rate storage medium 126f has considerable excess storage capacity. In fact, node 112f acts as serving node of only one small high availability file 168 as node 112e is close to overflow. Protocol 132 now instructs re-balancing module 144e to remove file 166 from its high-access-rate storage medium 126e.

Contemporaneously, protocol 132 instructs re-balancing module 144f to have node 112f become the serving node of file 166. Thus, re-balancing module 144f oversees the migration of file 166 from its low-access-rate storage medium 128f to its high-access-rate storage medium 126f. This migration is indicated by dashed arrow 170. Once the migration is performed, metadata including the path to file 166 now ready to be served from medium 128f of serving node 112f is updated to master 112i. This re-balancing operation based on storage capacity ensures continuous high availability of file 166 to clients 102a, 102b. In general, it is preferable that re-balancing operations based on storage capacity be continuously performed on a cluster-wide basis.

It should be noted that in practice it is advantageous that management portion of protocol 132 and subordinate portions of protocol 132' running on the machines of the k−1 nodes not communicate too often. In particular, their communications preferably take advantage of LAN 116 and are carried out asynchronously. It is preferable that only a few percent, and at most 10-20% of the bandwidth of LAN 116 be used for asynchronous communications by protocol 132, 132'.

The above-discussed re-balancing between the high-access-rate storage medium and the low-access-rate storage medium of at least one of the k−1 nodes is preferably practiced on the entire distribution of highly available files. In other words, all k−1 nodes are subject to re-balancing on an on-going basis.

Figure 5:
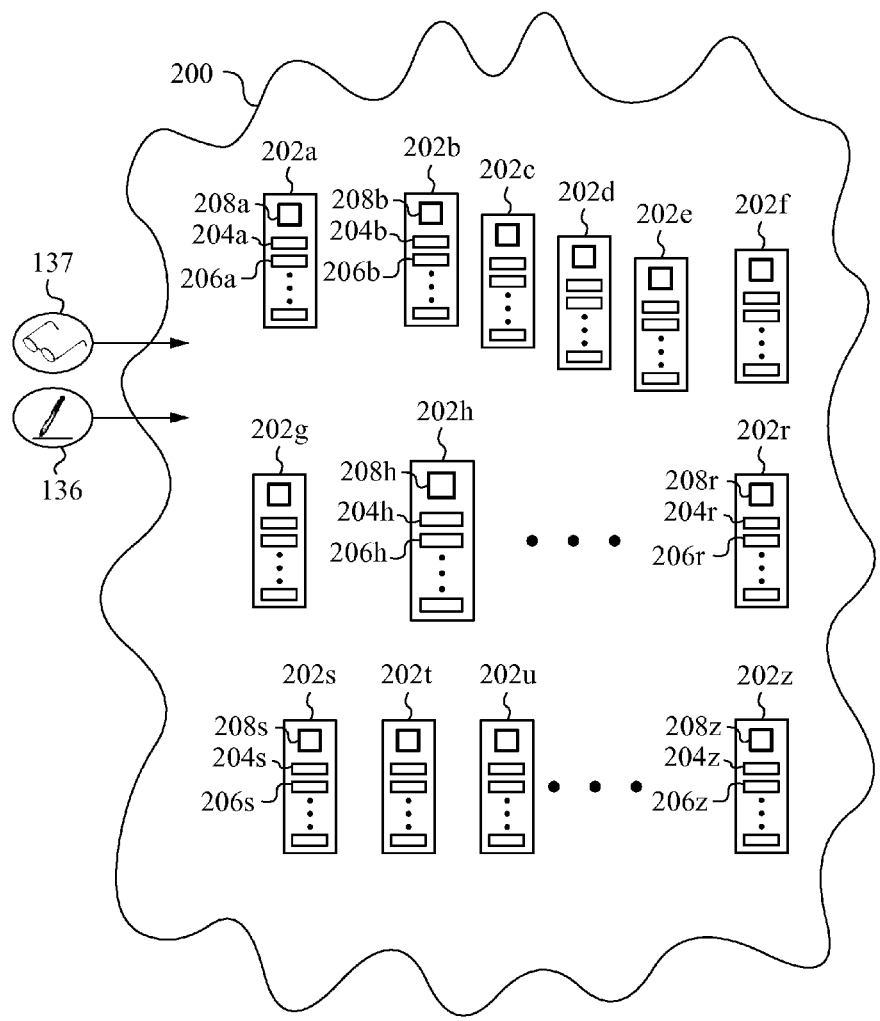
FIG. 5 is a diagram illustrating re-balancing of high availability files across an entire cluster in accordance with the invention.

FIG. 5 is a diagram illustrating re-balancing of high availability files across an entire cluster 200 in accordance with the invention. Cluster 200 has nodes 202a-z, each of which is endowed with corresponding high-access-rate storage medium 204a-z and a corresponding low-access-rate storage medium 206a-z. Thus, in this embodiment all nodes 202a-z belong to the k nodes that will be operated in accordance with the invention.

Nodes 202a-z have corresponding machines 208a-z, and one of nodes 202a-z, namely node 202h, is the leader or master of cluster 200. In general, it is not important for the present invention how master 202h is elected, although for reasons of resistance to split brain situations during failover, it is preferred that the election be performed by a majority-based quorum vote. The requisite voting protocols are well known to those skilled in the art.

Note that not all of the parts are explicitly labeled for reasons of clarity. For the same reason, the connection lines of the LAN in cluster 200 are not shown in this figure, but all nodes 202a-z are properly interconnected to provide for local communications.

Machine 208h of master 202h runs management portion of a protocol (not explicitly shown in this figure) designed for managing and re-balancing cluster 204. Remaining k−1 machines, namely machines 208a-g, 208i-z each run subordinate portion of the protocol (not explicitly shown in this figure) designed to participate in the management and re-balancing of cluster 200.

During operation of cluster 200, master 202h and more specifically its machine 208h running the protocol, obtains asynchronous reports from all k−1 nodes 202a-g, 202i-z about the popularity of the highly available files they have been assigned to serve from their corresponding high-access-rate storage media 204a-g, 204i-z. The popularity is determined based on read requests 137 and write requests 136.

Of course, machine 208h of master 202h knows all incoming requests 137, 136 because it is in charge of cluster 200. Thus, it can in principle compute the popularities of the highly available files on all k−1 nodes itself. However, because it is desirable to off-load as many non-essential operations from master 202h as possible, and because the computation of popularity may be performed over long time periods (e.g., several minutes) it is advantageous that it be computed and tracked by the protocol running on machines 202a-g, 204i-z of the k−1 nodes 202a-g, 202i-z.

In the present embodiment, the protocol running on all machines not only monitors requests 137, 136 to determine popularity of the high availability files their nodes are serving. Additional parameters, including a processing load on each node, a processing cost on each node and other parameters, such as time-averaged I/O throughput are also monitored. In addition, the previously used parameters including capacity of high-access-rate storage media 204a-g, 204i-z is monitored as well to prevent overflow.

Given knowledge of the above parameters, master 202h is in a position to supervise, with the aid of the protocol, cluster-wide re-balancing. The re-balancing decisions can be based on any of the above parameters or any combinations thereof and/or their averages. The individual re-balancing operations are performed in the manner already described above.

It should also be noted that a popular file that is very large can be re-distributed by breaking it up into segments. The segments can be re-distributed to one or more supplementary serving nodes of that file. This may be done with several additional nodes. For this reason, as well as other considerations, it is advantageous that the parameter on which re-balancing is based be a cluster-wide parameter. Such cluster-wide parameter can be computed jointly from parameters for the individual machines of all or a subset of the k−1 nodes.

Furthermore, it is advantageous that the method of invention be applied to typical data files, rather than log files. Such typical data file can be segmented in storage blocks that are relatively large, i.e., storage blocks that exceed a certain block size. Preferably, such block size is determined to work well with the particular choice of flash drives chosen to serve as the high-access-rate storage media.

Finally, depending on the cluster management protocols and provisioning for failover situations, the low-access-rate storage medium of the serving node should be mirrored. Note mirroring files between high-access-rate storage media is not desirable. Only the file as it exists on the low-access-rate storage medium should be imaged to the low-access-rate storage medium of an imaging node of cluster 200. In most cases, the imaging node is the back-up node. Failover, in case of serving node failure, will typically proceed to this back-up node in accordance with most cluster management protocols. In fact, the distributed storage medium management protocol of the invention can be easily integrated or incorporated in standard cluster management protocols, such as ZooKeeper.

In view of the above teaching, a person skilled in the art will recognize that the apparatus and method of invention can be embodied in many different ways in addition to those described without departing from the spirit of the invention. Therefore, the scope of the invention should be judged in view of the appended claims and their legal equivalents.

I claim:

1. A method of storage medium management in nodes of a high availability cluster that serves one or more complete files to a network client, said method comprising:
    a) provisioning a number k of said nodes, where k≥2 and includes a master node, each of said nodes having a high-access-rate non-transitory storage medium and a low-access-rate non-transitory storage medium;
    b) selecting a file from said one or more complete files, and assigning an individual node from among k−1 nodes excluding said master node, to be the serving node of said file and writing said file to said high-access-rate non-transitory storage medium of said serving node;
    c) writing said file to said low-access-rate non-transitory storage medium of each of k−2 nodes excluding said master node and said serving node;
    d) monitoring, with a storage medium management protocol distributed among said k nodes, an availability to said network client of said file on said high-access-rate non-transitory storage medium of said serving node;
    e) migrating said file from said low-access-rate non-transitory storage medium of a back-up node selected from among said k−1 nodes to said high-access-rate non-transitory storage medium of said back-up node upon disruption of said availability on said serving node, and assigning said back-up node to be the new serving node;
    f) updating on said master node a metadata about said file and a path to said file, whereby said master node can direct future requests by said network client to said file via said updated path;
    g) and re-distributing said file to said high-access-rate non-transitory storage medium of at least one supplementary serving node selected from among said k−1 nodes, wherein said re-distributing further comprises breaking said file into segments and re-distributing said segments to said at least one supplementary serving node;
thereby providing for high availability of said file to said network client.

2. The method of claim 1, further comprising:
    a) monitoring a popularity of said file on said high-access-rate non-transitory storage medium of said serving node;
    b) removing said file from said high-access-rate non-transitory storage medium when said popularity of said file drops below a predetermined threshold.

3. The method of claim 2, further comprising migrating a second file from said low-access-rate non-transitory storage medium to said high-access-rate non-transitory storage medium of said serving node when a popularity of said second file exceeds said predetermined threshold.

4. The method of claim 1, further comprising re-balancing the distribution of said one or more complete files among said high-access-rate non-transitory storage medium and said low-access-rate non-transitory storage medium of at least one among said k−1 nodes.

5. The method of claim 4, wherein said re-balancing is based on a parameter selected from the group consisting of a number of write-requests, a number of read-requests, a capacity of said high-access-rate non-transitory storage medium, a processing load and a processing cost.

6. The method of claim 5, further comprising re-distributing said file to said high-access-rate non-transitory storage medium of a supplementary serving node selected from among said k–1 nodes when said capacity of said high-access-rate non-transitory storage medium of said serving node is exceeded.

7. The method of claim 5, wherein said parameter is a cluster-wide parameter computed jointly for said k–1 nodes.

8. The method of claim 1, further comprising mirroring said file between said low-access-rate non-transitory storage medium of said serving node and an imaging node of said high availability cluster.

9. The method of claim 8, wherein said imaging node is said back-up node.

10. The method of claim 1, wherein said storage medium management protocol is incorporated in ZooKeeper.

11. The method of claim 1, wherein said high-access-rate non-transitory storage medium comprises a flash storage drive.

12. The method of claim 1, wherein said low-access-rate non-transitory storage medium comprises a hard disk drive.

13. A high availability cluster of nodes employing heterogeneous storage media in serving one or more complete files to a network client, said high availability cluster comprising:
   a) a number k of said nodes, where k≥2 and includes a master node, and where a file is selected from said one or more complete files, and one of k–1 nodes excluding said master node is assigned to be the serving node for serving said file to said network client;
   b) a high-access-rate non-transitory storage medium associated with each of said k nodes, wherein said file is written to said high-access-rate non-transitory storage medium of said serving node;
   c) a low-access rate non-transitory storage medium associated with each of said k nodes, wherein said file is written to said low-access-rate non-transitory storage medium of each of k–2 nodes excluding said master node and said serving node;
   d) a distributed storage medium management protocol residing on said k nodes for monitoring an availability to said network client of said file on said high-access-rate non-transitory storage medium of said serving node, and for migrating said file from said low-access-rate non-transitory storage medium of a back-up node selected among said k nodes to said high-access-rate non-transitory storage medium of said back-up node upon disruption of said availability on said serving node, and assigning said back-up node to be the new serving node of said file, said distributed storage medium management protocol further providing for updating on said master node a metadata about said file and a path to said file, whereby said master node can direct future requests by said network client to said file via said updated path and said distributed storage medium management protocol further comprising re-distributing said file to said high-access-rate non-transitory storage medium of at least one supplementary serving node selected from among said k–1 nodes, wherein said re-distributing further comprises breaking said file into segments and re-distributing said segments to said at least one supplementary serving node;
thereby providing for high availability of said file to said network client.

14. The high availability cluster of claim 13, wherein said high-access-rate non-transitory storage medium comprises a flash storage drive.

15. The high availability cluster of claim 13, wherein said low-access-rate non-transitory storage medium comprises a hard disk drive.

16. The high availability cluster of claim 13, further comprising a re-balancing module associated with each of said k nodes.

17. The high availability cluster of claim 16, wherein said re-balancing module is configured to monitor said availability of said file.

18. The high availability cluster of claim 16, wherein said re-balancing module is configured to monitor a popularity of said file.

19. A method of storage medium management in nodes of a high availability cluster that serves one or more complete files to a network client, said method comprising:
   a) provisioning a number k of said nodes, where k≥2 and includes a master node, each of said nodes having a high-access-rate non-transitory storage medium and a low-access-rate storage medium;
   b) selecting a file from said one or more complete files, and assigning an individual node from among k–1 nodes excluding said master node, to be the serving node of said file and writing said file to said high-access-rate non-transitory storage medium of said serving node;
   c) writing said file to said low-access-rate non-transitory storage medium of each of k–2 nodes excluding said master node and said serving node;
   d) monitoring, with a storage medium management protocol distributed among said k nodes, an availability to said network client of said file on said high-access-rate non-transitory storage medium of said serving node;
   e) migrating said file from said low-access-rate non-transitory storage medium of a back-up node selected from among said k–1 nodes to said high-access-rate non-transitory storage medium of said back-up node upon disruption of said availability on said serving node, and assigning said back-up node to be the new serving node of said file;
   f) updating on said master node a metadata about said file and a path to said file, whereby said master node can direct future requests by said network client to said file via said updated path;
   g) re-balancing the distribution of said one or more complete files among said high-access-rate non-transitory storage medium and said low-access-rate non-transitory storage medium of at least one among said k–1 nodes;
   h) basing said re-balancing on a parameter selected from the group consisting of a number of write-requests, a number of read-requests, a capacity of said high-access-rate non-transitory storage medium, a processing load and a processing cost;
   i) and re-distributing said file to said high-access-rate non-transitory storage medium of at least one supplementary serving node selected from among said k–1 nodes, wherein said re-distributing further comprises breaking said file into segments and re-distributing said segments to said at least one supplementary serving node;
thereby providing for high availability of said file to said network client.

20. A method of storage medium management in nodes of a high availability cluster that serves one or more complete files to a network client, said method comprising:
   a) provisioning a number k of said nodes, where k≥2 and includes a master node, each of said nodes having a high-access-rate non-transitory storage medium and a low-access-rate non-transitory storage medium;
   b) selecting each file from said one or more complete files, and assigning an individual node from among k–1 nodes excluding said master node, to be the serving node of said file and writing said file to said high-access-rate non-transitory storage medium of said serving node;

c) writing said file to said low-access-rate non-transitory storage medium of each of k−2 nodes excluding said master node and said serving node;

d) monitoring, with a storage medium management protocol distributed among said k nodes, an availability to said network client of said file on said high-access-rate non-transitory storage medium of said serving node;

e) migrating said file from said low-access-rate non-transitory storage medium of a back-up node selected from among said k−1 nodes to said high-access-rate non-transitory storage medium of said back-up node upon disruption of said availability on said serving node, and assigning said back-up node to be the new serving node of said file;

f) updating on said master node a metadata about said file and a path to said file, whereby said master node can direct future requests by said network client to said file via said updated path;

g) re-balancing the distribution of said one or more complete files among said high-access-rate non-transitory storage medium and said low-access-rate storage medium of at least one among said k−1 nodes;

h) basing said re-balancing on a parameter selected from the group consisting of a number of write-requests, a number of read-requests, a capacity of said high-access-rate non-transitory storage medium, a processing load and a processing cost;

i) mirroring said file between said low-access-rate non-transitory storage medium of said serving node and an imaging node of said high availability cluster, and selecting said imaging node to be said back-up node;

j) and re-distributing said file to said high-access-rate non-transitory storage medium of at least one supplementary serving node selected from among said k−1 nodes, wherein said re-distributing further comprises breaking said file into segments and re-distributing said segments to said at least one supplementary serving node;

thereby providing for high availability of said file to said network client.

* * * * *